INVENTOR.
EDWARD M. COAN
BY Robert K. Youtie
ATTY.

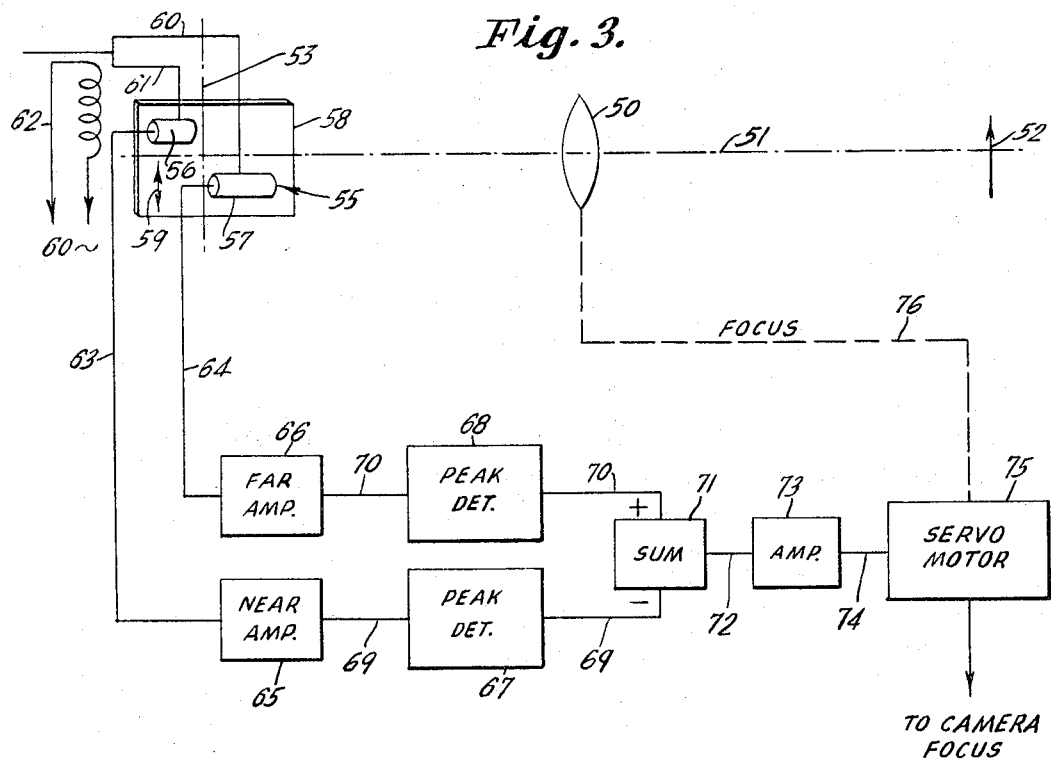

United States Patent Office 3,422,274
Patented Jan. 14, 1969

3,422,274
RADIATION SENSITIVE APPARATUS FOR
SENSING AND COUNTING
Edward M. Coan, c/o Emerge Associates, 331 Chester Ave.,
Moorestown, N.J. 08057
Filed June 1, 1964, Ser. No. 371,561
U.S. Cl. 250—224      11 Claims
Int. Cl. H01j 39/12

ABSTRACT OF THE DISCLOSURE

Sensing apparatus which includes means for focusing radiation at a nominal location from an object to be sensed, and detecting means along the path of focused radiation on opposite sides of the nominal location for detecting variations in radiation.

This invention relates generally to electro-optical sensing methods and systems, and is especially concerned with unique structural features and method steps in electro-optical sensing.

While the method and apparatus of the present invention has been primarily developed and employed for use in sensing and counting edges, say of stacked sheet material, and will be illustrated and described hereinafter with particular reference thereto, it is understood that the novel features of the instant invention are capable of many varied applications, all of which are intended to be comprehended herein.

One object of the present invention resides in the provision of a unique method and arrangement of electro-optical sensing elements capable of greater accuracy in sensing by variation in transmission.

The instant invention further contemplates the provision of a unique method and apparatus for quickly, accurately and economically sensing and counting the edges of sheet material, such as stacked metal, paperboard, or the like.

Another object of the instant invention resides in the provision of a unique method and apparatus for effectively sensing the out-of-focus, say of photographic or television systems, and the like, both the amount and direction of out-of-focus, to enable the same to be automatically corrected.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 3 is a schematic representation of an automatic focusing apparatus constructed in accordance with the teachings of the present invention.

Figure 1:
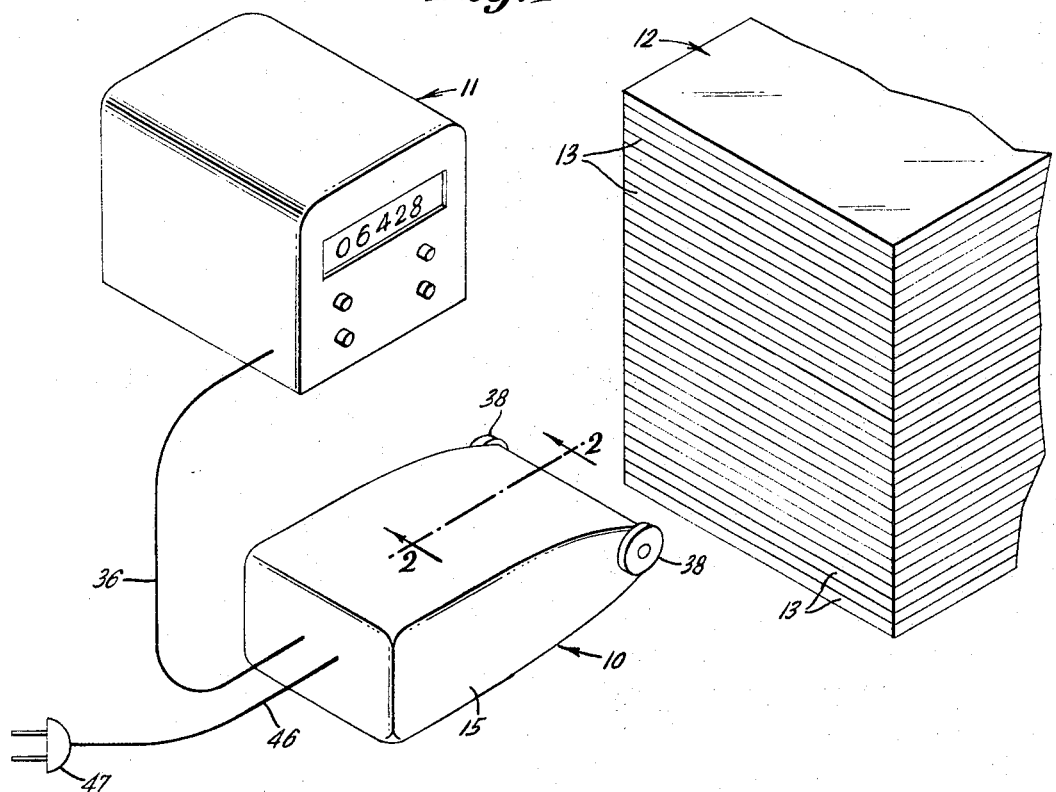
FIGURE 1 is a perspective view illustrating an edge-counting device constructed in accordance with the teachings of the present invention.
Figure 2:
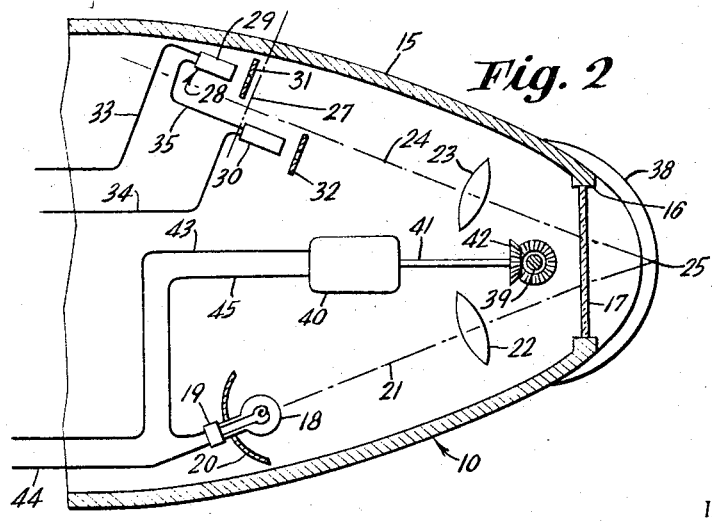
FIGURE 2 is a partial sectional view taken generally along the line 2—2 of FIGURE 1, diagrammatically illustrating the operative components of the instant sensing apparatus.

Referring now more particularly to the drawings, and specifically of FIGURES 1 and 2 thereof, the sensing apparatus of the instant invention is shown in FIGURE 1 embodied as an edge counter including a working head 10, and a counter 11, such as an electronic read-out counter. A stack of sheets is generally designated 12 and shown with exposed contiguous edges 13 extending in generally coplanar relation.

The working head 10 includes a housing or enclosure 15 of any suitable construction and having at one end an opening 16 which may be closed by suitable, light-permeable means, such as a glass 17. Mounted interiorly of the housing 15 is a source of radiation or illumination, such as a lamp 18 carried in a socket 19 and advantageously provided with a reflector 20 directing radiation from the lamp along an optical path 21 toward the opening 16. Interposed in the optical path 21, between the lamp 18 and opening 16 may be a focusing system, diagrammatically represented by a lens 22, for focusing illumination from the lamp, say by parallelizing the rays of light.

A second focusing system, diagrammatically represented by a lens 23, is mounted in the housing 15 having its axis at an angle with respect to that of the focusing system 22. The axis of focusing system 23 is generally designated 24 and is illustrated as defining an acute angle with the optical axis 21, intersecting therewith at a location 25 adjacent to and externally of the housing opening 16. In practice, as will appear more fully hereinafter, the light transmitted from source 18 through focusing means 22 is adapted for incidence upon an object at location 25 and reflection therefrom to focusing means 23. The focusing means 23 has its focal point along the axis 24 at the nominal location of line 27 intersecting the axis.

Along the optical axis 24, in the region of nominal location or focal plane 27, there is mounted in the housing 15 detector means generally designated 28.

The detector means 28 of the present invention includes a pair of sensing elements, say photodetectors or cells 29 and 30. The cells 29 and 30 are arranged to face toward the direction of incoming light along axis 24, and at spaced locations therealong. In particular, detector element 29 is located along the optical axis 24 rearward of the focus or nominal location 27, while detector element 30 is located along the axis 24 forward of the nominal location or focus 27. Further, the detector elements 29 and 30 are offset from each other transversely of the axis 24, being illustrated as lying on opposite sides thereof. This offset relationship of the detector elements 29 and 30 transversely of the axis 24 enables the respective elements to receive illumination independently of each other substantially along the axis, as through respective aperture plates 31 and 32. The detector elements are thus offset from each other both transversely of the axis 24 and longitudinally along the axis, lying on opposite sides of the focus location 27, respectively rearwardly and forwardly thereof.

Suitable electrical connection may be made to the photodetectors 29 and 30, such as the illustrated series connection including conductors 33 and 34 connected to respective detectors 29 and 32, and a conductor 35 connected between the detectors. Upon extension externally from the housing 15, the conductors 33 and 34 may be combined in a single cord 36 connected to the counter 11.

Externally on opposite sides of the housing 15, adjacent to the opening 16, may be provided housing-mounting means, such as a pair of axially aligned, rotatable wheels 38. The wheels 38 may be carried by an axle 39 extending through and journaled in the housing 15. The wheels 38 may be of a diameter to extend forwardly beyond the housing 15 substantially the same distance as the point 25. Thus, the point 25 will be substantially coincident with a surface upon which the wheels 38 may roll.

Also carried by the housing 15 may be a drive motor 40 having a drive shaft 41 and connected to the axle 39 by gearing 42. Thus, the motor 40 is in driving relation with the axle 39 and wheels 38, so that the housing 15 may be hand-held and moved along a surface with the wheels 38 in rolling engagement with the surface to effect housing movement at a predetermined speed.

Suitable power connections are made to the motor 40 and lamp 18, as by conductors 43 and 44 respectively to the motor and lamp, and a conductor 45 connected between the motor and lamp. The conductors 43 and 44 may extend externally from the housing 15 as a cord 46 having a plug 47 or other means for connection to a power source.

In operation, a user may manually hold the working head 10 and move the same along the generally coplanar edges 13 of stack 12, as by powered rolling of the wheels 38 along the edges. If desired, other means may be provided for effecting relative movement between the working head 10 and sheets 12 or other objects to be sensed.

As the working head 10 moves relative to the sheet edges 13, the illumination along path 21 is incident upon the successive edges and reflected therefrom generally along the axis 24. The reflected light along axis 24 varies upon reflection from the edges 13 and the interfaces of the sheets. This variation is sensed by the detecting means 28 and causes the production of signals which are transmitted to and counted by the counter 11. Further, as reflected illumination is neither precisely parallel, nor precisely along axis 24, the actual focus of reflected illumination is not always at nominal location 27. Rather, the focus of reflected illumination may vary on either side, forwardly and rearwardly of the nominal location 27. In order to assure more accurate detection of each variation in reflected illumination, the detector elements 29 and 30 are located on opposite sides of the nominal location 27, respectively rearwardly and forwardly thereof. By this arrangement, a relatively deep field of focus and sensitivity thereto is obtained. Of course, additional detector elements may be provided, if desired, at additional locations longitudinally along the axis 24 for providing sensitivity to a greater depth of focus.

Also, relative movement between the working head 10 and stacked objects 12 may be obtained in other ways, as by sliding one relative to the other, or the like.

In the embodiment of the invention shown in FIGURE 3, there is provided means for automatically focusing a camera, such as a photographic or television camera. The automatic-focus-adjustment means may include a focusing system, diagrammatically represented by lens 50, which may be of adjustable focus. Along the optical axis 51 of the focusing system 50 is illustrated an object 52. At a nominal location indicated by line or plane 53 is the focus or focal point of focusing system 50. In the region of nominal location 53 is located detecting means, generally designated 55. The detecting means may include a plurality of detecting elements, such as photodetectors 56 and 57 disposed along the optical axis 51 facing toward the focusing system 50 and spaced from each other longitudinally along the optical axis on opposite sides of the location 53. Thus, the photodetector or sensing element 56 is positioned rearwardly of the nominal location 53, and the sensing element or photodetector 57 is positioned forwardly of the nominal location. Also, the photodetectors 56 and 57 are offset from each other transversely of the optical axis 51 for independent reception of radiation from the focusing means 50. In addition, the photodetectors 56 and 57 are mounted for vibratory or scanning action, as on a vibrator 58 arranged to oscillate or vibrate transversely of the optical axis 51, as indicated by the arrow 59. The photodetectors 56 and 57 are thus spaced longitudinally along the optical axis 51 on opposite sides of the nominal location 53, and offset from each other transversely of the optical axis, while being mounted for simultaneous movement transversely of the optical axis, generally normal thereto.

A suitable carrier frequency, such as 60 cycle may be impressed upon the photodetectors 56 and 57, as by conductors 60 and 61 connected to power source 62. In addition, output conductors 63 and 64 are connected between respective detectors 56 and 57 and their amplifiers 65 and 66. The amplifier 65 carries the legend "NEAR" as its corresponding detector 56 senses when the object 52 is too near for focus at nominal location 53, and the amplifier 66 carries legend "FAR" as its detector 57 senses when object 52 is too far for focus at nominal location 53. The amplifiers 65 and 66 are connected to respective peak detectors 67 and 68 by conductors 69 and 70. The peak detectors 67 and 68 feed through conductors 69 and 70 to an adder 71. The resultant signal is fed through conductor 72 to an amplifier 73, and as amplified through a conductor 74 to an operator 75, such as a servo motor. The servo motor is thereby operated the proper amount and direction to adjust focusing means 50, through suitable mechanical connection 76 to correct focus to the nominal location 53. The servo motor 75 may also serve to operate adjustable focusing means of a photographic or television camera; or, the focusing means 50 may be that of a television or photographic camera, if desired.

As operation is believed apparent from the foregoing description, it is now understood that the variations in radiation or light detected by respective detectors 56 and 57, as at the edges of the focused image, the greater variation being sensed by the detector closest to the actual plane of focus. These variations cause signals which modulate the carrier current, and the sum of the signals serves to move the focal plane forward or rearward, as required, toward a correct position at nominal location 53. The use of vibrator 58, or other suitable scanning means assures the production of signals by the detectors 56 and 57 resulting from variations in received illumination even in the absence of a moving object.

From the foregoing, it is seen that the present invention provides a highly improved method and apparatus for sensing objects, and otherwise fully accomplishes its intended purposes. While the illustrated embodiment of FIGURE 3 is shown in conjunction with automatic camera focusing, it is appreciated that the instant method and apparatus are admirably well suited for other applications, such as determining range and providing automatic tracking of range.

Although the present invention has been described in some detail by way of illustration and example for purposes of clarity of understanding, it is understood that certain changes and modifications may be made within the spirit of the invention and scope of the appended claims.

What is claimed is:

1. Sensing apparatus comprising means for causing reflected radiation from an object to be sensed, focusing means for focusing said reflected radiation at a nominal location, radiation-passing masks located along the path of focused radiation at locations spaced in a direction parallel to said path on opposite sides of said nominal location, and detecting means associated with said masks for signaling the detection of radiation passing thereby.

2. Sensing apparatus according to claim 1, in combination with scanning means connected to said detecting means causing the latter to scan and detect signal variations in detected radiation upon scanning.

3. Sensing apparatus according to claim 1, in combination with focusing-adjustment means connected to said detecting and focusing means for adjusting the latter responsive to signals from said detecting means.

4. Sensing apparatus according to claim 3, said detecting means comprising a pair of detecting elements, said adjusting means comprising motor means operative in response to signals from said detecting elements for focusing said focusing means.

5. Sensing apparatus according to claim 1, in combination with means for effecting relative movement between said masks with their associated detecting means and a series of objects to be sensed.

6. Sensing apparatus according to claim 1, said masks and their associated detecting means comprising a plurality of detecting elements offset transversely of said path for receiving said focused radiation independently of each other.

7. Sensing apparatus according to claim 1, said radiation-causing means comprising illuminating means for illuminating an object and causing reflected illumination, said focusing means comprising lens means for focusing said reflected illumination, and said detecting means comprising photo-detecting means for detecting said focused illumination.

8. An edge counter comprising a housing having a light-permeable opening, illuminating means in said housing, first focusing means focusing light from said illuminating means through said opening for transmission to edges to be counted, second focusing means in said housing for focusing reflected illumination from said edges at a nominal location in said housing, and a plurality of photodetectors mounted in said housing along the path of reflected illumination at locations spaced in a direction parallel to said path on opposite sides of said nominal location for sensing variations in reflected illumination upon relative movement between said housing and said edges.

9. An edge counter according to claim 8, in combination with counting means connected to said photodetectors for counting the cycles of variation in reflected illumination.

10. An edge counter according to claim 8, in combination with means mounting said housing for movement relative to said edges transversely thereof in predetermined timed relation.

11. An edge counter according to claim 10, said mounting means comprising powered-wheel means rotatably carried by said housing for rolling engagement with said edges.

References Cited

UNITED STATES PATENTS

| | | | |
|---|---|---|---|
| 2,525,311 | 10/1950 | Peyrebrune | 250—221 |
| 2,816,479 | 12/1957 | Sloan | 250—222 |
| 2,872,590 | 2/1959 | Leavens | 250—239 X |
| 2,894,147 | 7/1959 | Stidwill | 250—222 X |
| 2,908,825 | 10/1959 | Frankle et al. | 250—223 X |
| 3,001,081 | 9/1961 | Bower | 250—222 |

WALTER STOLWEIN, *Primary Examiner.*

U.S. Cl. X.R.

250—209